Nov. 2, 1954   E. B. FERNBERG   2,693,011
METALLIC FASTENER FOR RESILIENT SEALING STRIP
Filed March 29, 1949   4 Sheets-Sheet 1
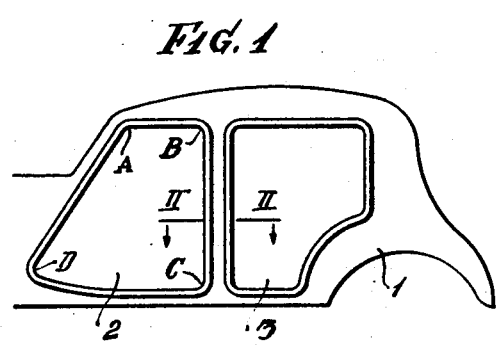
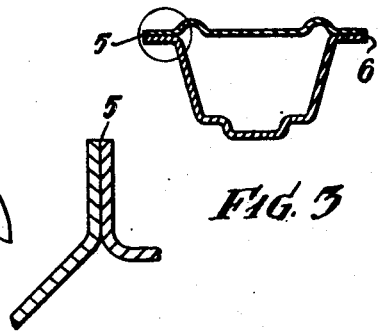
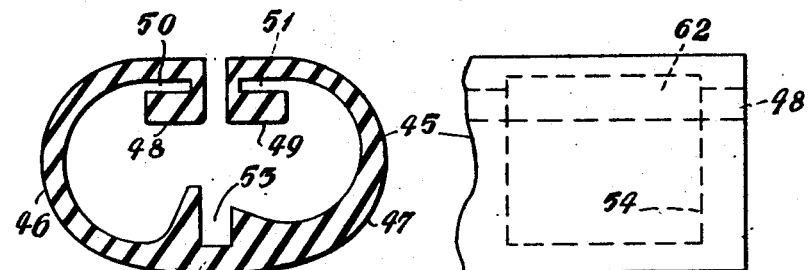
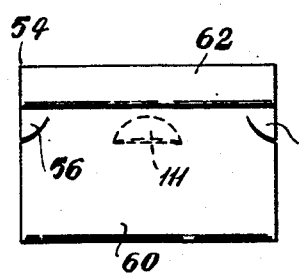
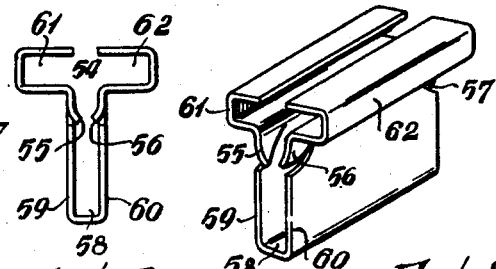
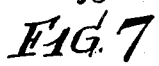
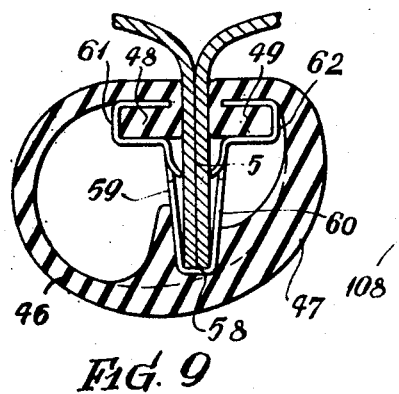
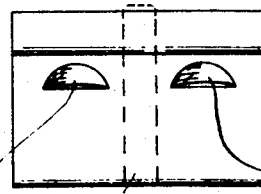
Inventor
ERIC BIRGER FERNBERG
By Leo Edelson
Attorney

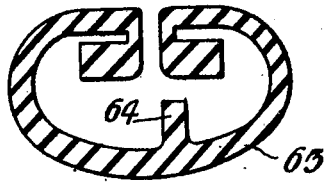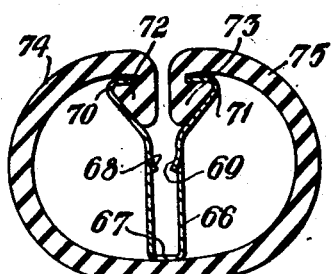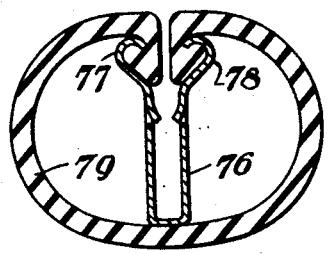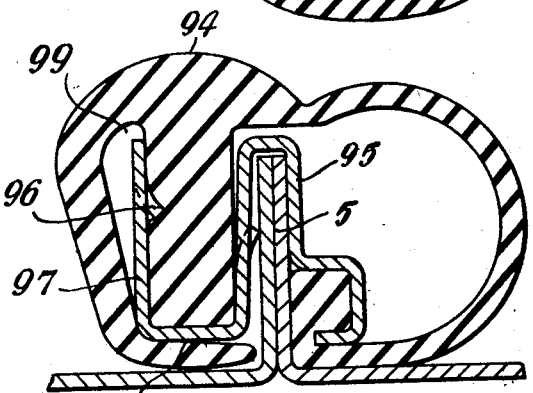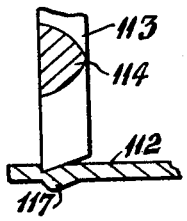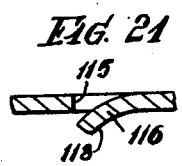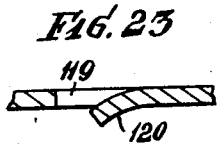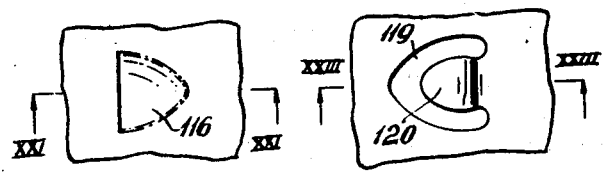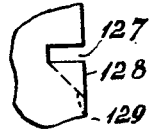

Nov. 2, 1954   E. B. FERNBERG   2,693,011
METALLIC FASTENER FOR RESILIENT SEALING STRIP
Filed March 29, 1949   4 Sheets-Sheet 3
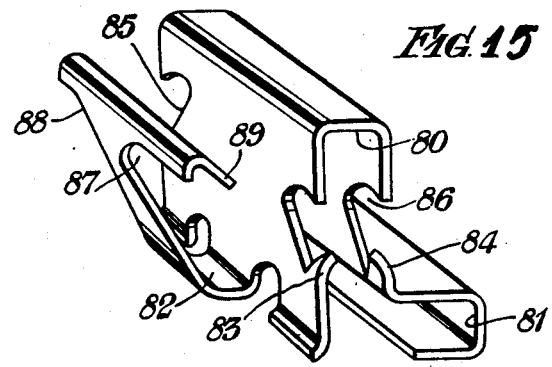
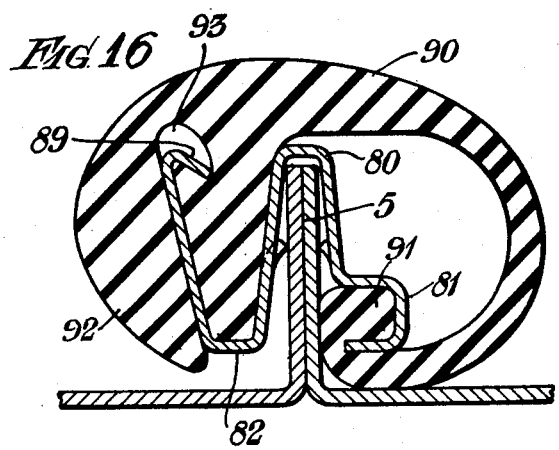
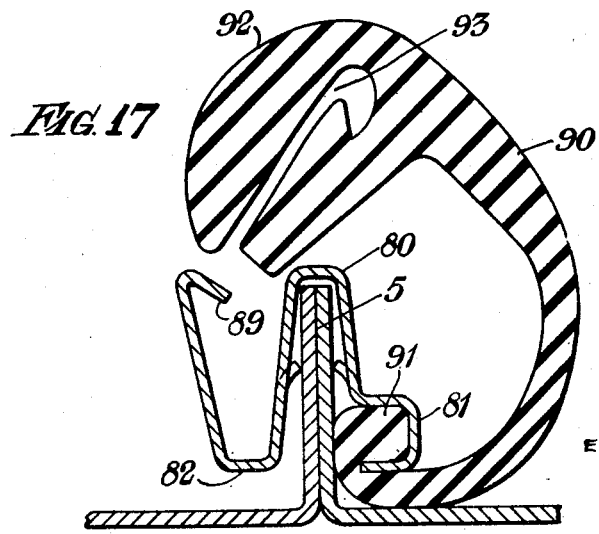
Inventor
ERIC BIRGER FERNBERG
By
Attorney Nov. 2, 1954 E. B. FERNBERG 2,693,011
METALLIC FASTENER FOR RESILIENT SEALING STRIP
Filed March 29, 1949 4 Sheets-Sheet 4

Inventor
ERIC BIRGER FERNBERG
By *Leon Edelson*
Attorney

United States Patent Office 2,693,011
Patented Nov. 2, 1954

2,693,011

METALLIC FASTENER FOR RESILIENT SEALING STRIP

Eric Birger Fernberg, Pinner, England

Application March 29, 1949, Serial No. 84,048

2 Claims. (Cl. 20—69)

The present invention relates to an improved fastener, and although not exclusively limited thereto, is particularly suitable for securing an article of relatively soft material to another article of harder material, for example for securing a rubber strip to the edge of a metal sheet.

It is standard practice at the present time to form, on the inside of the door-opening of an automobile, a flange of rectangular section (which henceforth will be called a "metal edge") on which is secured a rubber sealing strip against which the door closes to exclude draughts, rain and dust.

The sealing strip may be applied to the metal edge with the aid of a plurality of metal fasteners made according to this invention and which are secured at intervals along the length of the strip and to the metal edge.

Preferred forms of the invention will now be described with reference to the accompanying diagrammatic drawings, in which:

Figure 1 is a side elevation of the side panel of a steel vehicle body,

Figure 2 is a section on the line II—II of Figure 1,

Figure 3 is an enlarged view of that portion of Figure 2 which is inscribed by the circle, said Figure 3 being turned 90° with respect to Figure 2.

Figures 4 and 5 are a side elevation and a transverse section respectively of a rubber strip used as a draught excluder and to be secured in and around the door openings of the vehicle panel of Figure 1, Figures 6, 7 and 8 are a side, end and perspective view respectively of a fastener with the aid of which the rubber strip of Figures 4 and 5 is secured in the said door openings, Figure 9 is a transverse section of the metal edge, the rubber strip and fastener of Figures 6 to 8 shown in position on the vehicle body.

Figure 10 is a side elevation of a fastener similar in general shape to that of Figures 6 and 7 but having prongs cut out of the internal area of a limb.

Figure 11 is a perspective view illustrating one prong.

Figure 28:
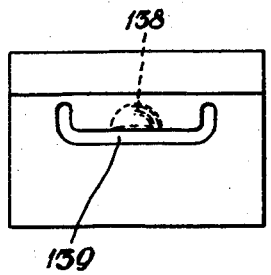
Figure 29:
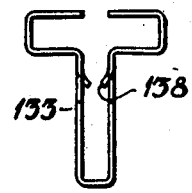

Figure 12 is a transverse section of another form of rubber strip,

Figures 13 and 14 are transverse sections of alternative forms of strip and fastener, Figure 15 is a perspective view of another fastener, Figure 16 is a transverse section through the same fastener, a rubber sealing strip and a metal edge to which the strip is attached by the fastener, Figure 17 is a similar section illustrating the manner in which the strip is attached to the metal edge, Figure 18 is a section through yet another fastener, rubber strip and metal edge, Figure 19 illustrates a step in the formation of the fastener of Figure 10, Figure 20 is a plan of a portion of the fastener of Figure 10, Figure 21 is a section on the line XXI—XXI of Figure 20, Figure 22 is a plan of a portion of a fastener showing an improved form of prong, Figure 23 is a section on the line XXIII—XXIII of Figure 22, Figures 24 to 27 show several ways of forming an improved prong cut from the edge of a fastener, and Figures 28 and 29 are front and side elevations respectively of yet another fastener.

Referring now to Figures 1 to 9, at 1 is shown the side panel of a steel vehicle body. The panel is formed with door openings at 2 and 3 around the edges of each of which is to be secured a draught excluding rubber strip 45 of the shape shown in Figures 4 and 5.

The nature of the inner edge of the door openings can be seen by inspection of Figure 2 which is a section on the line II—II of Figure 1. The section at this line is of box form and comprises the metal edges 5 and 6 which extend all the way round the openings 2 and 3 respectively.

Referring now more particularly to Figures 4 and 5, the strip 45 here shown comprises a length of extruded rubber or like resilient material of part-tubular shape with two flanges 46 and 47 the edges of which are inwardly turned and enlarged as at 48 and 49 to present grooves 50 and 51. The central portion or web 52 of the strip is formed with a longitudinal channel-shaped recess 53.

In Figures 6, 7 and 8 is shown a fastener 54 suitable for use with the strip 45 of Figures 4 and 5. This fastener is formed by shearing and bending a rectangular strip of metal. The rectangular strip is formed with four symmetrically placed shear cuts in its longer sides, which cuts are bent to form inwardly directed prongs such as 55, 56 and 57.

After shearing in the manner indicated the strip of metal is bent at right angles to form a central or second channel 58 having approximately parallel limbs 59 and 60 which at the upper ends are bent to form outer or first and second channels 61 and 62 respectively which grip or support the enlarged edges 48 and 49 of the flanges 46 and 47 of the resilient strip 45.

In use the fastener 54 is mounted within the resilient strip, the outer or first and third channels 61 and 62 of the fastener engaging the enlargements 48 and 49 and in the grooves 50 and 51 of the resilient strip, whilst the middle or second channel 58 of the fastener is seated in the longitudinal recess 53 of the strip.

The fasteners are positioned at intervals along the length of the resilient strip.

The engaged strip and fastener are then applied to the metal edge 5 of the vehicle body so that the edge enters between the flanges 46 and 47 of the resilient strip and between the limbs 59 and 60 of the second channel of the fastener, and also between the prongs 55 and 56 of the fastener.

The prongs are located internally with respect to the second channel 58 and the points are directed to the base thereof so as to grip the metal edge securely and with sufficient force to prevent the strip from being accidentally pulled off.

It will be appreciated that with the construction as above described when the vehicle door is closed and the edge of the door contacts the strip too great distortion of the strip is prevented by the additional rigidity imparted thereto by the metal fasteners.

Figure 12 shows an alternative form of resilient strip 63 comprising an upstanding rib 64 against the side of which the second channel 58 of the fastener bears.

Figure 13 shows another form of resilient strip 65 without an internal rib or channel and having a fastener 66 in the form of a middle or second channel 67 formed with prongs 68 and 69 and contiguous with two outer first and third channels 70 and 71, each of V-section, engaging the enlarged edges 72 and 73 of the flanges 74 and 75 of the rubber strip.

Figure 14 shows a fastener 76 similar to that of Figure 13 except that the outer or first and third channels 77 and 78 of the fastener are of part-circular or curved form to engage in grooves or channels correspondingly formed in the edges of the flanges of a resilient strip 79.

The fastener illustrated in Figures 15 to 17 is formed from a single strip of metal which is bent about parallel lines to form a central or second channel 80, a first channel 81 and a third channel 82. The second channel 80 is formed with four similar prongs of which three are shown in Figure 15 at 83, 84 and 85.

An area such as 86 above each prong is cut away for a purpose to be described later.

The neck of the outer side of the first channel 81 is cut away as at 87 and 88 and the end of this side of the channel is turned over and in to form a hook 89.

Figures 16 and 17 illustrate the manner in which the fastener is used to attach a rubber sealing strip 90 to a metal edge 5.

The edge of one flange of the rubber sealing strip 90 is formed with an enlargement 91 which can be engaged in the rectangular outer or third channel 82 of the fastener. The middle or second channel 80 of the fastener is then forced over the metal edge 5, being held securely thereon by the four prongs 83 etc. and finally the other flange 92 of the strip, which is formed with a hook-shaped groove 93 of the section shown, is forced over the V-shaped hook 89 of the fastener so that the hook engages in the groove 93.

In this manner the rubber strip is securely attached to the metal sheet.

The assembly shown in Figure 18 comprises a rubber strip 94, a metal edge 5 and a fastener 95 which is similar to that of Figures 15 to 17 except that the hook 89 of Figures 15 to 17 is replaced by a prong 96 sheared and bent out of the outer side 97 of the first channel 98 of the fastener. The operation of this fastener is similar to that of Figs. 15 to 17, except that the prong 96 bites into the rubber instead of the hook 89 hooking into the end of the channel 93.

Instead of cutting the prongs out of the edge of the strip they may be formed, as shown at 108 and 109 in Figures 10 and 11, wholly within the periphery of the material of the fastener, and in order to strengthen the fastener it may be formed with a beading 110 (Figure 10) running around that channel which serves to grip the metal edge. Any of the fasteners described herein may be formed with such a strengthening beading.

It is frequently found that the section of the metal edge 5 (Fig. 3) is not uniform along its length and therefore, even if all the pairs of facing prongs such as 55 and 56 (Figs. 7 and 8) are equidistant, which is difficult to ensure in practice, the gripping achieved varies in strength from pair to pair owing to the variations of the metal edge and when the rubber strip is pulled a fastener may twist, the weaker pair of prongs losing grip and the stronger pair holding.

The grip may be equalised, however, by putting two prongs on one arm of the channel 58 and, on the other arm, one prong which is equidistant between the other two.

Thus for example the fastener of Figures 6 to 8 is modified by omitting the prongs 56 and 57 on the side 60, and replacing them by one prong 111 (Figure 6), located on this arm midway between the other two, i. e., half-way along the width of the arm 60. In this way the fastener gets a three point grip on the metal edge and the pressure exerted by the outer prongs in the side 59 is equalised.

This arrangement is used whether the outer prongs be of the edge or inset type. The centre prong must invariably be of the inset type.

Figures 19, 20 and 21 illustrate the manner in which the prongs have been made by me hitherto.

In order to form an inset type of prong a strip of metal 112 constituting a blank is placed upon a die (not shown) and a punch 113 of the section shown at 114 is forced through the metal so that, in one operation, the metal is sheared through, at 115, and a semi-oval or tongue portion of the metal is bent out of the general plane of the strip to form a prong 116.

Figure 19 shows the punch just entering the metal and it will be seen that the first effect of the punch is to bend the under side of the strip at 117 just before the metal ruptures, leaving a rounded underside to the tip 118 (Figure 21) of the finished prong. This curvature at the tip of the prong prevents it from getting as firm a grip as it might do upon the member to which the fastener is secured.

It is an object of the present invention to provide a method of forming the prongs in which the above-described disadvantage is eliminated.

Figures 22 and 23 illustrate a novel and better method of making the prongs.

A punch is used which, in one operation, shears out the area 119 and bends down the area 120 to form a prong. The area 119 is completely removed and the area 120 is turned down at the same time into the position shown in Figure 23, with no tendency for an inward curl to develop on its tip.

The prong 120 of Figures 22 and 23 gives a better grip on the metal edge 5 (of Figure 2) or other member to be gripped, than does the prong 116 of Figure 21, because the underside of the tip of the prong is sharp-cornered.

The same principle is adopted in forming prongs of the edge type.

Thus, as shown in Figure 24, a punch is used which, in one operation, cuts away the area 121 and bends over the sharp-pointed prong 122 about the line 123.

In Figure 25 the punch cuts away the area 124 to leave a prong 125 with a rounded tip 126 which gets a better frictional grip on the member to be gripped.

As shown in Figure 26 a rectangular area 127 is cut away and the prong 128 is bent over about the line 129.

As shown in Figure 27 the area 130 is sheared away and the square-nosed prong 131 is bent over about the line 132.

In the arrangement illustrated in Figures 28 and 29 the fastener indicated generally at 133 is similar to that shown in Figures 6, 7 and 8 except that the prongs 56 and 57 of Figure 8 are replaced, in Figures 28 and 29, by the prong 138, the latter being formed by cutting away the area 139 and bending over the area 138.

Certain advantages accrue from the use of the particular section of rubber strip described in the above embodiments. For instance, it will be seen that the rubber strip illustrated in Figures 16, 17 and 18 comprises one half which is relatively thin and flexible and the end (91, of Figures 16 and 17) is enlarged and held in one of the outer channels of the fastener in such a way that it cannot be easily pulled out of that channel, whilst as shown in Figures 16 and 18, the other half of the section of the rubber strip is relatively thick and much more rigid than the more flexible half. The flexible half as it were hinges about the point where the two halves meet. It will be seen that the two halves are radiused about different centres thereby providing a longitudinal line along the strip where the two halves meet. This breaking up of the surface of the strip vastly improves the look of the strip.

Referring still to Figure 18, it will be seen that the thicker half of the section of the strip comprises an outer flap which serves to hide the outer channel 98 of the fastener. The flap is inclined inwardly so that when the strip is lapped around a corner such as A in Figure 1 the flap is prevented from moving in the outward direction but on the contrary is urged inwardly.

Throughout this specification the expression "contiguous" is used to denote that the metal of which a fastener is made runs continuously from one channel into another without being folded back so that one part of the metal lies in surface contact with another part, and where reference is made to the "major axis" of a channel, by this is meant that axis lying parallel with the sides or limbs of the channel.

I claim:

1. An assembly of a substantially rigid structural body member having a freely disposed edge, a flexible sealing strip of rubber or rubber-like material and a plurality of resilient fasteners for mounting said sealing strip upon said member in embracing relation with respect to said freely disposed edge thereof, each fastener comprising a single strip of sheet material bent about parallel lines into the shape of three contiguous open-mouthed channels and having a prong formed in a side of the middle channel with its point directed internally and rearwardly with respect to that channel, the middle channel and one of the outer channels having their open mouths directed towards a common point and their major axes approximately perpendicular, the flexible strip being formed with two longitudinal internal ribs disposed in parallel, laterally spaced relation to provide an opening therebetween extending along the full length of the strip, each fastener being located within the strip with the open mouth of the middle channel in substantial registry with said opening between the internal ribs of the flexible strip, and the freely disposed edge of the body member being retentively gripped by the pronged middle channel of each fastener while the ribs of the flexible strip are respectively retained by the outer channels of each fastener.

2. An assembly of a substantially rigid structural body member having a freely disposed edge, a flexible sealing strip of rubber or rubber-like material and a plurality of resilient fasteners for mounting said sealing strip upon said member in embracing relation with respect to said freely disposed edge thereof, each fastener comprising a single strip of sheet material bent about parallel lines into the shape of three contiguous open-mouthed channels and having a prong formed in a side of the middle channel with its point directed internally and rearwardly with respect to that channel, the middle channel and one of the outer channels having their open mouths directed towards a common point and their major axes approximately perpendicular, while the middle channel and the other channel have their open mouths pointing in opposite directions and their major axes approximately parallel, the flexible strip being formed with two longitudinal internal ribs disposed in parallel, laterally spaced relation to provide an opening therebetween extending along the full length of the strip, each fastener being located within the strip with the open mouth of the middle channel in substantial registry with said opening between the internal ribs of the flexible strip, and the freely disposed edge of the body member being retentively gripped by the pronged middle channel of each fastener while the ribs of the flexible strip are respectively retained by the outer channels of each fastener.

References Cited in the file of this patent

UNITED STATES PATENTS

| Number | Name | Date |
| --- | --- | --- |
| 693,122 | Dorsey | Feb. 11, 1902 |
| 800,361 | Corper | Sept. 26, 1905 |
| 886,608 | Jersemann | May 5, 1908 |
| 1,077,099 | Shafer | Oct. 26, 1913 |
| 1,737,375 | King | Nov. 26, 1929 |
| 1,763,603 | Donahue | June 10, 1930 |
| 2,091,791 | Newman | Aug. 31, 1937 |
| 2,139,329 | Fessler | Dec. 6, 1938 |
| 2,358,206 | Boersma | Sept. 12, 1944 |
| 2,379,179 | Petersen | June 26, 1945 |
| 2,466,935 | Doty | Apr. 12, 1949 |
| 2,485,189 | Churchill | Oct. 18, 1949 |
| 2,554,452 | Bright | May 22, 1951 |